(12) United States Patent
Cardamone et al.

(10) Patent No.: US 8,092,120 B2
(45) Date of Patent: Jan. 10, 2012

(54) METHOD FOR ASSEMBLING A RACK PORTION OF A SELF-RAISING OIL RIG

(75) Inventors: David Cardamone, Ecuisses (FR); Philippe Mabelly, Le Breuil (FR)

(73) Assignees: Industeel France, Puteaux (FR); Civad SA, Montchanin (FR)

( * ) Notice: Subject to any disclaimer, the term of this patent is extended or adjusted under 35 U.S.C. 154(b) by 1002 days.

(21) Appl. No.: 10/562,946

(22) PCT Filed: Jun. 29, 2004

(86) PCT No.: PCT/FR2004/001668
§ 371 (c)(1),
(2), (4) Date: Jun. 20, 2006

(87) PCT Pub. No.: WO2005/012649
PCT Pub. Date: Feb. 10, 2005

(65) Prior Publication Data
US 2007/0107184 A1    May 17, 2007

(30) Foreign Application Priority Data
Jul. 2, 2003   (FR) ...................................... 03 08057

(51) Int. Cl.
*B23K 37/00*   (2006.01)
(52) U.S. Cl. .......... 405/198; 219/137.2; 219/74; 228/45
(58) Field of Classification Search ................... 405/198; 219/136, 125.1, 72, 73, 73.21, 74, 137 PS, 219/137.2; 228/4.1, 165–169, 171, 174, 228/45
See application file for complete search history.

(56) References Cited

U.S. PATENT DOCUMENTS

| 2,093,881 | A | * | 9/1937 | Conrad | 219/75 |
| 2,148,427 | A | * | 2/1939 | Howard et al. | 228/173.1 |
| 2,198,534 | A | * | 4/1940 | Howard et al. | 219/86.51 |
| 3,307,014 | A | * | 2/1967 | Toyoaki et al. | 219/137 R |
| 3,967,457 | A |   | 7/1976 | Lovie | |

(Continued)

FOREIGN PATENT DOCUMENTS

DE           11 04 641 B     4/1961

(Continued)

*Primary Examiner* — Sunil Singh
(74) *Attorney, Agent, or Firm* — Sughrue Mion, PLLC

(57) ABSTRACT

Method for assembling a rack portion (1) of a self-raising oil rig, which rack portion (1) is constituted by at least one rectangular plate (3) which comprises teeth (51) at the longitudinal lateral faces (5) thereof, and at least one reinforcement (8) which is in the form of a half-shell and which is welded to a main face (6) of the at least one rectangular plate, along the longitudinal edges (11) of the at least one reinforcement, according to which an internal chamfer and an external chamfer which are separated by a projection of thickness T are produced at each of the longitudinal edges (11) of the at least one reinforcement (8), the at least one reinforcement (8) is provided at a main face (6) of the rectangular plate (3), at least one welding pass is carried out at the internal portion of each of the longitudinal edges (11) of the at least one reinforcement in order to produce an internal weld bead having a connection radius R greater than or equal to 4 mm, and the chamfers are filled at the external portion of each of the longitudinal edges of the at least one reinforcement by an external weld bead which is produced in at least one pass with addition of metal.

10 Claims, 4 Drawing Sheets

U.S. PATENT DOCUMENTS

Figure 1:
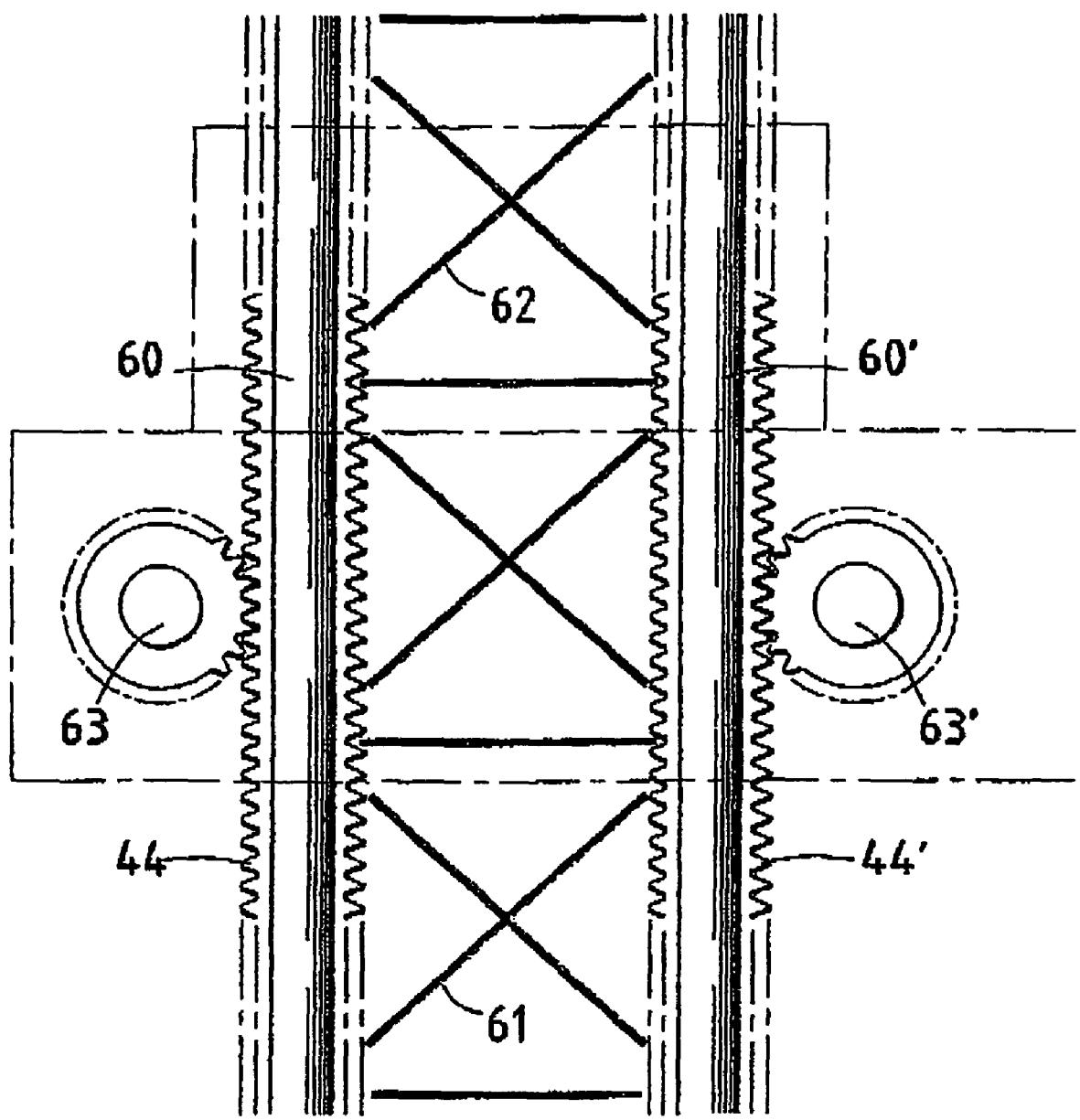

| | | | | |
|---|---|---|---|---|
| 5,607,259 A | * | 3/1997 | Thomas et al. | 405/198 |
| 7,406,767 B2 | * | 8/2008 | Primot et al. | 29/897.31 |
| 2005/0226689 A1 | * | 10/2005 | Primot et al. | 405/198 |

FOREIGN PATENT DOCUMENTS

| | | | |
|---|---|---|---|
| DE | 3535212 A1 | * | 4/1987 |
| EP | 0 645 496 A | | 3/1995 |
| FR | 2 719 611 A | | 11/1995 |
| FR | 2 719 615 A | | 11/1995 |
| JP | 58188577 A | * | 11/1983 |
| JP | 60 154875 A | | 8/1985 |
| WO | WO 2004/004959 A | | 1/2004 |
| WO | WO 2004004959 A2 | * | 1/2004 |

* cited by examiner

METHOD FOR ASSEMBLING A RACK PORTION OF A SELF-RAISING OIL RIG

The present invention relates to a rack portion of a self-raising oil rig.

Self-raising oil rigs are constituted by a hull which is carried by legs which are intended to be supported on the ocean bed. In order to be able to adjust the height of the hull relative to the feet of the legs, the hull is mounted so as to be movable along the legs. The adjustment of the position of the hull relative to the feet of the legs is carried out by means of a device which is constituted by toothed wheels which engage with racks, the racks constituting members of the legs.

The racks are constituted by portions which are welded end to end and which are formed, at one side, by a rectangular plate and, at the other side, by reinforcements in the form of half-shells which are welded to the main faces of the plate. Each rectangular plate comprises, on its lateral faces, teeth which are intended to co-operate with a toothed wheel of the drive device of the hull. Each reinforcement which is welded to one of the main faces of the rectangular plates has a length less than the length of a plate so as to allow two successive portions to be welded end to end. In order to ensure the continuity of the reinforcements, a connection piece in the form of a half-shell is positioned in the connection region between two successive portions. The reinforcements are fixed to the lateral faces of the rectangular plates by means of welding and the quality of the welds is a significant factor in the mechanical strength of the racks. In particular, the surface quality of the welds is a significant factor in terms of fatigue resistance.

In order to obtain welds of a satisfactory quality, a ceramic strut is provided inside the reinforcements, along the longitudinal edge of the reinforcement, at the junction of the rectangular plate, then the welding is carried out along the longitudinal edges of the reinforcement by welding from the exterior using a welding technique with addition of metal. The ceramic strut ensures the moulding of the weld bead in the internal portion of the reinforcement. The weld beads obtained in this manner have the advantage of having, in particular in the internal portion of the reinforcements, roots of good quality, having a good surface appearance and therefore good fatigue resistance. In particular for reasons relating to hot-fissuring during the welding operation, however, it has been demonstrated that it is not possible, with that technique, to obtain connections of the root of the weld in the internal region of the reinforcements having radii of curvature greater than three mm. Consequently, the fatigue resistance of those welds is limited. Furthermore, the welding technique which consists in using a ceramic strut sometimes makes controlling the welds difficult because, after the welding has been carried out on the ceramic strut, the strut must be removed so that the control of the weld can be carried out. Removal of the ceramic strut is not always simple. In particular, splinters of strut may remain embedded in the weld bead. Those strut splinters bring about faults in the weld which affect the mechanical strength thereof.

Owing to faults in terms of evenness of the plates or faults in terms of geometry of the reinforcements, the weld bead obtained is further not always very regular. Consequently, control by means of ultrasound of the quality of the welds finally obtained is difficult.

Finally, that welding technique using a ceramic strut is expensive, firstly because it requires the use of ceramic struts which are made to measure and which are themselves expensive and, secondly, because the positioning of ceramic struts and removal after welding are long operations which are also expensive.

The object of the present invention is to overcome those disadvantages by providing a technique for welding the reinforcements of the racks of a self-raising oil rig, which technique allows the fatigue resistance of the welds to be improved and is easier and more economical to carry out than known welding techniques.

To that end, the invention relates to a method for assembling a rack portion of a self-raising oil rig, which rack portion is constituted by at least one rectangular plate which comprises teeth at the longitudinal lateral faces thereof and at least one reinforcement in the form of a half-shell which is welded to a main face of at least one rectangular plate, along the longitudinal edges of the at least one reinforcement, characterized in that:

an internal chamfer and an external chamfer which are separated by a projection having thickness T are produced at each of the longitudinal edges of at least one reinforcement, the reinforcement is provided on the plate, at least one welding pass is carried out at the internal portion of each of the longitudinal edges of the reinforcement in order to produce internal weld beads having a connection radius R which is greater than or equal to 4 mm, and the chamfers are filled at the external portion of each of the longitudinal edges of the reinforcement by an external weld bead which is produced in at least one pass with addition of metal.

Preferably, the at least one welding pass which is carried out at the internal portion of each of the longitudinal edges of the reinforcement is a welding pass with addition of metal.

Furthermore, after the internal weld beads have been produced and before the chamfers have been filled at the external portion of the longitudinal edges of the reinforcement, it is preferable for the internal weld beads to be controlled and, if necessary, the faults to be ground and the weld beads to be repaired.

Preferably, the thickness T of the projection is less than the sum of the penetration depth of the internal weld bead, the penetration depth of the first pass of the external weld bead and the thickness of any grinding of a fault.

The internal weld bead can, for example, be produced by a method selected from the following methods: submerged arc welding, MIG welding, MAG welding, TIG welding and coated electrode welding. The external weld bead can be produced by the submerged arc welding method.

The reinforcement may be a connection piece between two reinforcements of two adjacent rectangular plates.

The invention also relates to a rack portion of a self-raising oil rig, which rack portion is constituted by at least one rectangular plate which comprises teeth at the longitudinal lateral faces thereof and at least one reinforcement which is in the form of a half-shell and which is welded to a main face of the at least one rectangular plate, along the longitudinal edges of at least one reinforcement, whose radius of curvature for connecting the internal weld bead of a reinforcement to the rectangular plate is greater than or equal to 4 mm.

Preferably, at least one connection weld between a reinforcement and a rectangular plate is constituted by at least one internal weld bead and at least one external weld bead.

Finally, the invention relates to a device for carrying out the method according to the invention which comprises a welding head which is constituted by a nozzle and a chamfer guide and which is carried by the end of an arm mounted so as to be articulated to a movable carriage, and which also comprises means for providing the welding head with filler metal, welding flux and electrical power.

The device for carrying out the method according to the invention may also comprise a carriage which is suspended on cables and which carries at least one welding head and guiding means, and may comprise means for providing at least one welding torch with filler metal, welding flux and electrical power.

Figure 2:
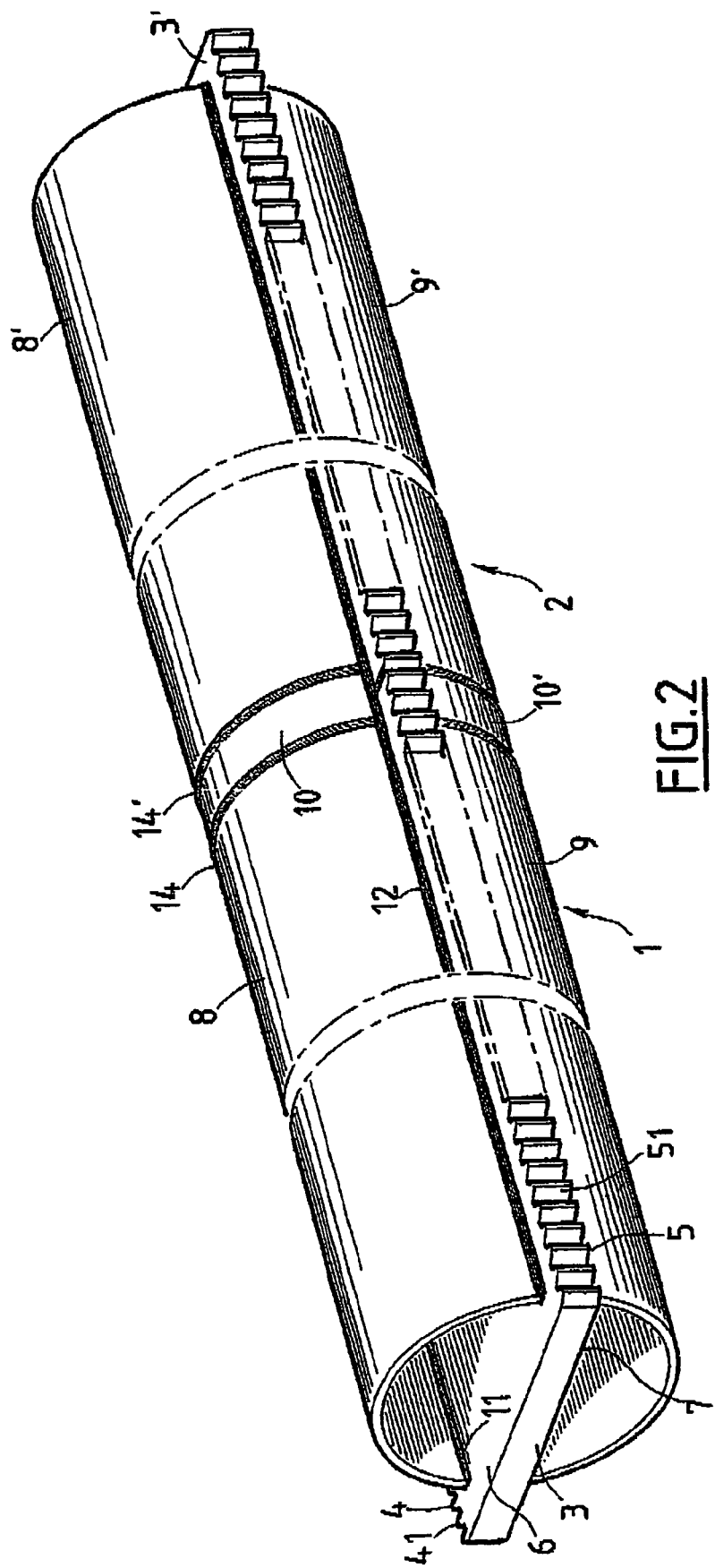
Figure 3:
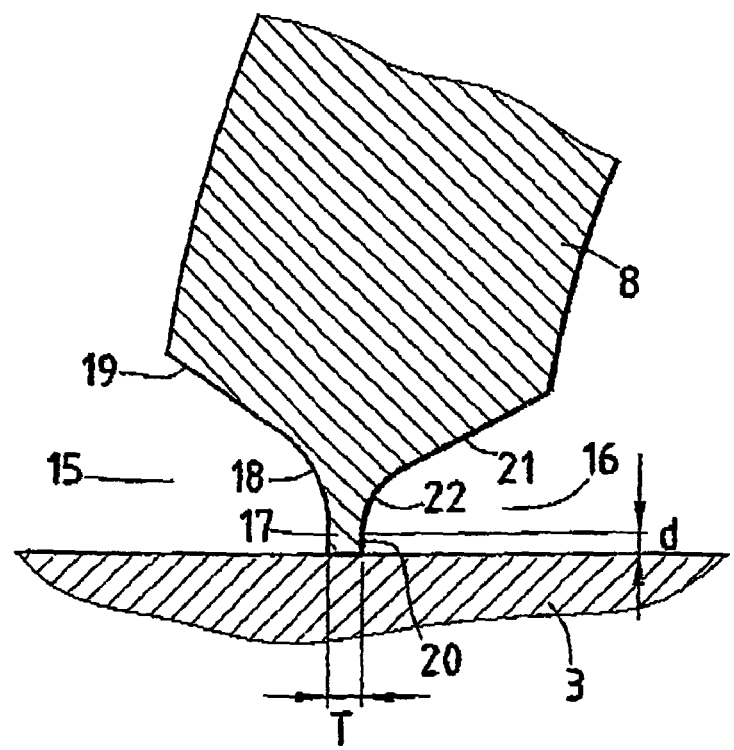
Figure 4:
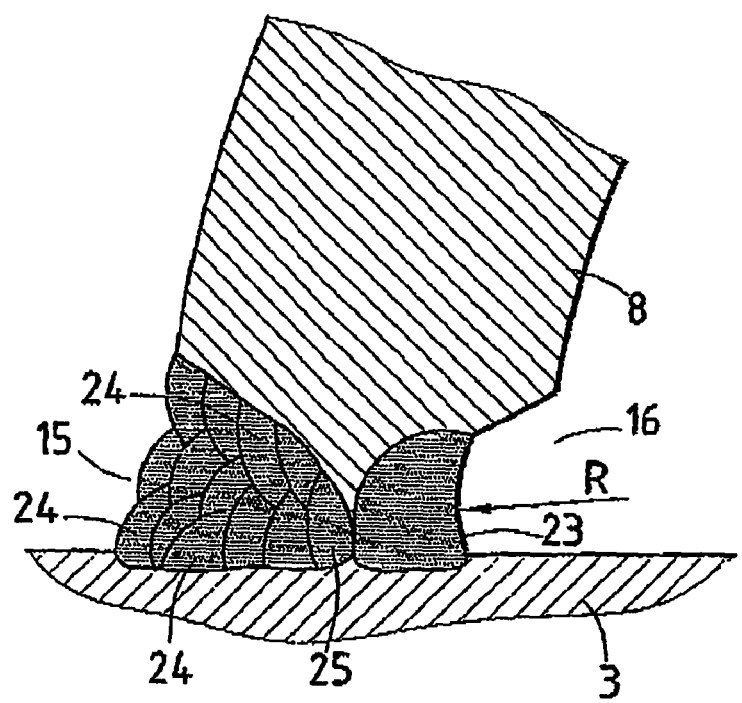
Figure 5:
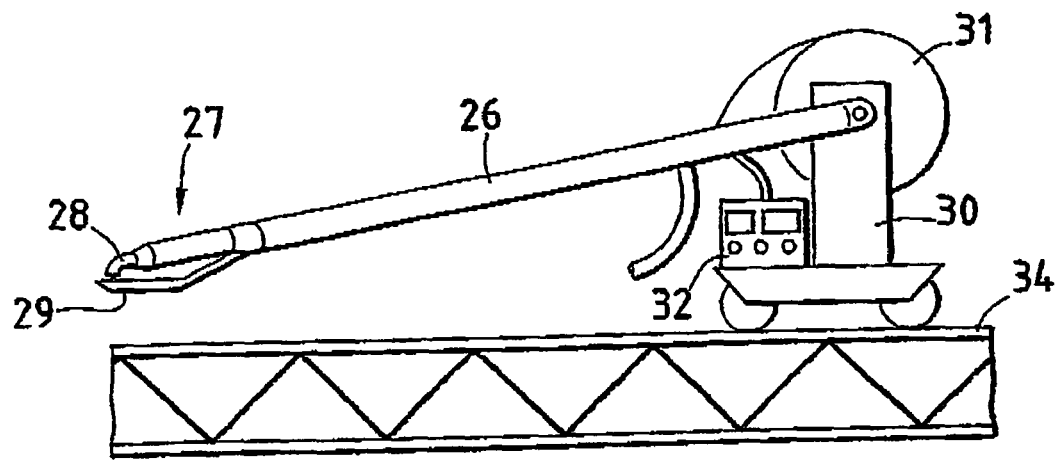
Figure 6:
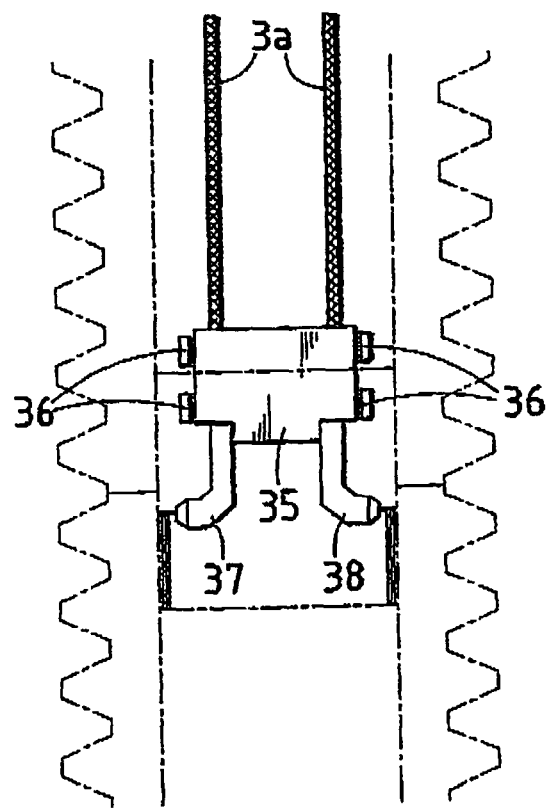

The invention will now be described in greater detail, but in a non-limiting manner, with reference to the appended Figures, in which:

FIG. 1 schematically illustrates a leg portion of a self-raising rig,

FIG. 2 is a perspective view of a rack element of a self-raising oil rig,

FIG. 3 is a sectioned view of the connection region of a reinforcement and a plate of a rack of an oil rig, before being welded, FIG. 4 is a sectioned view of the connection region of a reinforcement and a plate of a rack of an oil rig, after being welded, FIG. 5 is a schematic representation of a device used for welding the reinforcements to plates of the racks of oil rigs, FIG. 6 is a schematic view of a device for welding the connection pieces between two portions of two racks.

As is schematically illustrated in FIG. 1, a leg of a self-raising platform comprises vertical members 60, 60' which are constituted by racks and which are connected to each other by a grid 62. The racks comprise teeth 64, 64', with which toothed wheels 63, 63' which belong to the height adjustment device of the hull of the rig engage. The racks are constituted by a plurality of portions assembled end to end. As is illustrated in FIG. 2, two adjacent portions 1 and 2 are arranged as a continuation with respect to each other and are assembled by being welded. Since the two portions are identical, only portion 1 will be described below.

The portion 1 is constituted by a thick rectangular plate 3 whose lateral faces 4 and 5 are provided with teeth 41, 51, with which toothed wheels may engage. There are provided, on the upper main face 6 and lower main face 7 of the rectangular plate 3, reinforcements 8 and 9 in the form of half-shells whose lengths are less than the length of the rectangular plate 3. The half-shell-like reinforcements 8 and 9 are welded to the rectangular plate 3 along the longitudinal edges 11 and 12 thereof (only the longitudinal edges of the upper reinforcement 8 are visible in the Figure). Since the half-shell-like reinforcements 8 and 9 of the first portion 1 and the reinforcements 8' and 9' of the second portion 2 are shorter than the rectangular plates 3 and 3' which constitute the first and second portions, those reinforcements leave between them a space which is filled by an upper connection piece 10 which is also in the form of a half-shell and an identical lower connection piece 10'. Those connection pieces 10 and 10' are also reinforcements.

The connection pieces 10 and 10' are welded to the rectangular plates 3 and 3' along the edges which are in contact with the rectangular plate. They are also welded to the reinforcements 8, 8' and 9, 9' with which they cooperate, for example, along the edges 14 and 14' for the upper connection piece 10.

In order to weld a reinforcement, for example, the reinforcement designated 8 of FIG. 2, to the rectangular plate 3 along the longitudinal edges 11 or 12, firstly the edges 11 and 12 of the half-shell-like reinforcement 8 are machined in order to produce, on each of the edges, an external chamfer 15 and an internal chamfer 16 which are separated by a projection 17, as is illustrated in FIG. 3. The projection 17 is intended to come into abutment with the rectangular plate 3 and the chamfers 15 and 16 which bring about undercuts between the rectangular plate 3 and the reinforcement 8 are intended to receive weld beads.

The external chamfer 15 has a shape which is known to the person skilled in the art and comprises a concave profile in order to form an inclined lateral face 19 and a chamfer bottom 18. The internal chamfer 16 has either a planar form, that is to say that it substantially comprises an inclined wall 21, or a concave form, that is to say that it comprises not only an inclined wall 21 but also a chamfer bottom 20. In the latter case, the chamfer bottom and the wall 21 are connected by means of a connection radius 22.

The material contained between the chamfer bottom 18 of the external chamfer 15 and the chamfer bottom 20 of the internal chamfer 16 constitutes the projection 17. The projection 17 has a width T and a height d which corresponds to the width of the chamfer bottom 20.

After producing the chamfers at the two longitudinal edges of the upper reinforcement 8 and the lower reinforcement 9, a pre-assembly is constituted. In order to carry out that pre-assembly, the two reinforcements, the upper reinforcement 8 and lower reinforcement 9, are positioned on the faces 6 and 7 of the rectangular plate 3. Weld points are then produced in order to ensure the rigidity of the pre-assembly.

Once the pre-assembly has been brought about, at least one welding pass is carried out in the internal chamfer bottom of each of the reinforcements, the so-called root pass which is intended to form a root weld bead 23. Those root welding passes are carried out by means of a method with addition of welding metal, such as, for example, a submerged arc method, a MIG method, a MAG method, a TIG method or a coated electrode welding method. The welding operation is carried out so that there is a given level of penetration of the weld bead 23 inside the projection 17 which is located at the bottom of the chamfer 16. The number of welding passes carried out is selected in accordance with the geometry which it is desirable to obtain for the root weld bead. That geometry is substantially characterized by the connection radius R of the weld bead. In a manner known to the person skilled in the art, the connection radius of the weld bead is the radius of curvature of the internal surface of the weld bead that is orientated towards the inner side of the reinforcement. When the welding operation is carried out in a single pass, the connection radius R is greater than or equal to 4 mm, but approximately 4 mm. If the welding operation is carried out in several passes, the connection radius R may be far greater than 4 mm.

Since the mean length of the welds to be produced is approximately 12 m, taking into consideration the conventional size of the rack portions which are intended to be mounted on oil drilling rigs, the welding operation is generally carried out in two steps with the weld beads intersecting at the centre of the portion. That is to say that, firstly, a first half of the portion is welded starting at one end, then the second half of the portion is welded starting at the second end.

After producing the internal weld beads of a reinforcement, the weld beads inside the reinforcement are cleaned in order to remove the welding flux which may have remained attached during the welding operation. A control of the evenness of the root weld beads at the inner side is then carried out. That control is carried out, for example, by means of a camera. When faults are detected, those faults are indicated then ground from the outer side of the reinforcements in order to remove the metal in the corresponding regions. Once that metal has been removed, the weld bead is repaired by the same method as that for carrying out the root pass at the inner side, that is to say that welding is carried out from the interior. When the control and repair operations on the internal weld bead have been completed, and therefore sound internal weld beads are provided, the final filling of the external chamfers is carried out by means of a welding method with addition of metal, such as the submerged arc welding method. Magnetoscopic and ultrasonic control of all the welded joints is then carried out.

Proceeding in this manner brings about a connection between the reinforcement 8 and the rectangular plate 3 as illustrated in FIG. 4. That connection region comprises, at the inner side, an internal weld bead 23 which is produced in one or more passes and which has a connection radius R which is greater than or equal to 4 mm, and, at the outer side, a weld bead which is constituted by a plurality of elemental weld beads 24, 25 which are produced by a submerged arc type method. So that the welding is of good quality, it is necessary that the internal weld bead 23 and the first elemental weld bead 25 located at the bottom of the external chamfer 15 do not leave any space unoccupied. That assumes that there is a degree of interpenetration of the internal weld bead 23 and the first external elemental weld bead 25. To that end, the thickness of the projection T must be less than the sum of the penetration depth of the bead at the inner side and the penetration depth of the first elemental pass at the outer side, minus the metal thickness which may be removed by grinding before carrying out the first pass at the outer side. The penetration depths of the inner and the outer sides depend on the welding methods used, the energy parameters thereof and the geometry of the recesses in which the beads are deposited. The person skilled in the art knows how to establish those penetration depths of the weld beads.

Generally, the filler metal may be selected in accordance with the objectives set out for the properties of the welding.

The filler metal may have the same composition as the metal which constitutes the reinforcements and the rectangular plate. In that case, properties which are equivalent to the properties of the reinforcements and the rectangular plate are obtained for the welding.

The filler metal may also be slightly less heavily alloyed than the metal which constitutes the reinforcements and the rectangular plate. In that case, the risks of the weld fissuring are reduced.

Finally, if it is desirable to produce residual compression stresses in the weld beads in order to improve the fatigue resistance, it is possible to use a more heavily alloyed filler metal than the metal which constitutes the reinforcements and the rectangular plate.

The person skilled in the art knows how to select those filler products in accordance with the particular circumstances and therefore the specific objectives which he is seeking to fulfil.

The welding of the reinforcements to the rectangular plate is generally carried out in a workshop, the portion of the racks being arranged in the horizontal plane. The portions obtained in this manner are then assembled in situ in a vertical position during the construction of the legs of the rigs.

In order to carry out that welding operation, specific tools illustrated in FIG. 5 are used. Those tools are constituted by a relatively long arm 26, generally longer than 7 m, which carries at one of the ends thereof a welding head which is generally designated 27. The welding head 27 comprises firstly a welding nozzle 28 and secondly a chamfer guide 29 which is intended to be supported on the chamfer in which it is desirable to produce a weld bead. The arm 26 is mounted so as to be articulated, by means of the second end thereof, to a carriage 30 which is movable on rails 34. The carriage 30 may or may not be motor-driven. The carriage also carries a control housing and systems 32 for controlling the welding parameters, as well as a coil of wire 31 which will provide the welding head with welding wire. The control housing and the system for controlling the welding parameters are connected to a power generator (not illustrated) which is located remote from the carriage 30. The arm 26, which has a length which is adjustable so as to be adaptable to the length of the chamfer on which it is desirable to carry out the welding, has means for conveying firstly the welding flux and secondly the filler metal wire. The welding flux is conveyed by means of a pressurised sheath which is connected to a welding flux supply device, which is known per se and which is located near the motor-driven carriage. The filler metal wire is conveyed along the arm 26 by means of a "push-pull" system which is known per se and which is generally constituted by motor-driven pushing rollers and drawing rollers. The pushing rollers are arranged near the coil of filler metal wire 31 and the drawing rollers are arranged near the welding head 27. The welding flux supply device generally comprises an oven which is also located near the carriage.

The connection pieces 10, 10' which bring about the connection between the reinforcements of the two adjacent rack portions are welded, at one side, to the reinforcements 8 and 8' or 9 and 9', between which they are inserted, along the connection lines 14 and 14', and, at the other side, to the rectangular plates by the same method as that for the reinforcements 8 and 9. In this manner, the welds of the connection pieces comprise internal weld beads having a connection radius greater than 4 mm. However, the connection pieces 10 and 10' are not assembled when the rack portions are in the workshop, but instead they are assembled in situ when the oil rig is assembled. During the assembly of the oil rig, the elements of the racks are not horizontal, but instead vertical. In order to produce the welds of the connection pieces, such as the piece 10, it is therefore necessary to be able to introduce a welding head inside the reinforcements, or more precisely into the space available between the reinforcements and the rectangular plate, and to lower that welding means vertically as far as the region in which the weld has to be produced. In order to lower the welding heads inside the reinforcements, a device illustrated in FIG. 6 is used. The device comprises a carriage 35 which is provided with guiding means 36, which are, for example, small rollers, and which carries two welding torches 37 and 38 which are orientated so as to be able to weld along the two internal longitudinal edges 11 and 12. The movable carriage is suspended on two cables 39 which allow it to be raised or lowered inside the reinforcements.

Furthermore, the movable carriage is connected by means which are not illustrated, at one side, to a source of electrical power and, at the other side, to a means for providing the filler metal, for example, a coil of filler metal wire, and finally to means for supplying the welding flux which can be either solid flux or gaseous flux. Those means are known per se.

The method as has been described above is a method in which the root pass is carried out by a welding technique with filler metal. However, it is also possible to carry out that root pass using a welding technique without any filler metal. In this manner, satisfactory results are also obtained.

Generally, the method which has been described above has the advantage of providing a root which, in all cases, has a more satisfactory geometry than the geometry of the roots obtained by the technique using a ceramic strut, in particular because the minimum radius of connection of the weld bead at the inner side is greater than or equal to 4 mm. Furthermore, when the root pass is carried out by means of a technique with filler metal, it is possible, by selecting the filler metal appropriately, to adjust the mechanical properties of the root. In particular, it is possible to produce roots whose mechanical characteristics are increased relative to those which would naturally be provided. Furthermore, the welding method by repetition at the inner side, as has been described above, does not necessitate any difficult cleaning of the welds inside the reinforcements, as is the case with the welding technique with ceramic struts. Consequently, the productivity of the welding method is considerably improved. Finally, since the weld bead is not contaminated by debris, as is the case during welding with ceramic struts, the method is far more consistent and therefore far more repetitive and easier to control. Consequently, the welds obtained have a greater reliability than the welds obtained by known methods.

The invention claimed is:

1. Method for assembling a rack portion (1, 2) of a self-raising oil rig, which rack portion (1, 2) is constituted by at least one rectangular plate (3, 3') which comprises teeth (41, 51) at the longitudinal lateral faces (4, 5) thereof and at least one reinforcement (8, 8', 9, 9', 10, 10') in the form of a half-shell which is welded to a main face (6, 7) of the at least one rectangular plate (3, 3'), along the longitudinal edges (11, 12) of the at least one reinforcement (8, 8', 9, 9', 10, 10'), characterized in that:

- an internal chamfer (16) and an external chamfer (15) which are separated by a projection (17) having thickness T are produced at each of the longitudinal edges (11, 12) of the at least one reinforcement (8, 8', 9, 9', 10, 10'),
- the at least one reinforcement (8, 8', 9, 9', 10, 10') is/are provided on a main face (6, 7) of the rectangular plate (3),
- at least one welding pass is carried out at the internal portion of each of the longitudinal edges (11, 12) of the at least one reinforcement (8, 8', 9, 9', 10, 10') in order to produce an internal weld bead (23) having a connection radius R which is greater than or equal to 4 mm,
- and the chamfers are filled at the external portion of each of the longitudinal edges (11, 12) of the at least one reinforcement (8, 8', 9, 9', 10, 10') by an external weld bead (25) which is produced in at least one pass with addition of metal, the internal weld bead (23) having a degree of interpenetration with the external weld bead (25).

2. Method according to claim 1, characterized in that the at least one welding pass (23) which is carried out at the internal portion of each of the longitudinal edges (11, 12) of the at least one reinforcement (8, 8', 9, 9', 10, 10') is a welding pass with addition of metal.

3. Method according to claim 1, characterized in that, after the internal weld bead (23) is produced and before the chamfer (15) is filled at the external portion of the longitudinal edges (11, 12) of the at least one reinforcement (8, 8', 9, 9', 10, 10'), the internal weld bead (23) is further controlled and, if necessary, the faults are ground and the internal weld bead (23) is repaired.

4. Method according to claim 1, characterized in that the thickness T of the projection (17) is less than the sum of the penetration depth of the internal weld bead (23), the penetration depth of the first pass of the external weld bead and the thickness of any grinding of a fault.

5. Welding method according to claim 1 characterized in that the internal weld bead (23) is produced by a method selected from the submerged arc, MIG, MAG, TIG and coated electrode methods.

6. Method according to claim 1, characterized in that the external weld bead is produced by the submerged arc method.

7. Method according to claim 1, characterized in that the at least one reinforcement (10, 10') is a connection piece between two reinforcements (8, 8', 9, 9') of two adjacent rectangular plates (3, 3').

8. The method according to claim 7, characterized in that a device including a carriage (35) which carries at least one welding head (37, 38) and guiding means (36), the carriage being suspended on cables (39), and a means for providing the at least one welding head (37, 38) with filler metal, welding flux and electrical power is used to provide the internal weld bead.

9. Rack portion of a self-raising oil rig, which rack portion is constituted by at least one rectangular plate (3, 3') which comprises teeth (41, 51) at the longitudinal lateral faces (4, 5) thereof and at least one reinforcement (8, 8', 9, 9', 10, 10') which is in the form of a half-shell and which is welded to a main face (6, 7) of the at least one rectangular plate (3), along the longitudinal edges (11, 12) of the at least one reinforcement (8, 8', 9, 9', 10, 10'), wherein at least one connection weld between the at least one reinforcement (8, 8', 9, 9', 10, 10') and the at least one rectangular plate (3) is constituted by at least one internal weld bead and at least one external weld bead;

- the at least one internal weld bead having a degree of interpenetration with the at least one external elemental weld bead;
- characterized in that the radius of curvature for connection of the internal weld bead (23) is greater than or equal to 4 mm.

10. System for carrying out the method according to claim 1, characterized in that it comprises a welding head (27) which is constituted by a nozzle (28) and a chamfer guide (29), the head being carried by the end of an arm (26) mounted so as to be articulated to a movable carriage (30), and in that it comprises means for providing the welding head with filler metal, welding flux and electrical power; the arm (26) having a length of more than 7 m,

- wherein the chamfer guide is supported on a chamfer on which it is desirable to produce a weld bead.

* * * * *